INVENTORS:
JOHN F. DONAN
LAWRENCE D. HINDALL
By Herbert E. Metcalf
THEIR PATENT ATTORNEY

United States Patent Office 2,781,169
Patented Feb. 12, 1957

2,781,169
VECTOR ADDER

John F. Donan, Los Angeles, and Lawrence D. Hindall, Gardena, Calif., assignors to Northrop Aircraft, Inc., Hawthorne, Calif., a corporation of California Application March 16, 1951, Serial No. 216,064

9 Claims. (Cl. 235—61)

This invention relates to electronic adders, and, more particularly, to an electronic vector adder.

The resultant sum magnitude of two or more separate vectors is often desired in vector problems. For example, when two component vectors are each fully defined as to magnitude and direction, it is frequently only required to determine the magnitude of their resultant. If vectors are specified in electrical terms such as by voltage and phase for example, electronic means can be efficiently employed to compute a resultant magnitude when component vectors are known.

It is, accordingly, an object of this invention to provide electronic means capable of vertorially adding vectors represented by electrical signals such that a single output signal proportional to the resultant magnitude of these component vectors is obtained.

It is another object of the invention to provide an electronic device wherein D. C. signals proportional to vector components can linearly modulate phase-adjustable A. C. waves so that their added sum, as represented by a single D. C. output signal, is vectorially correct in magnitude.

Still another object of the present invention is to provide electronic means for continuously generating the vectorial sum magnitude of electrically represented vectors varying at a maximum frequency change of 5 C. P. S. with a 40 C. P. S. A. C. source signal, for example.

It is a further object of the invention to provide a new and novel electronic vector adder that is simple of construction and operation.

Briefly, the foregoing objects, and other objects ancillary thereto, are preferably accomplished by providing constant frequency sine wave signals of a reference phase and of an adjustable phase which can be linearly modulated by D. C. voltages proportional to vector magnitudes using balanced modulators, such that by adding these modulated waves in an electronic mixer, amplification and rectification of the mixed signal will produce a D. C. voltage directly proportional to the vectorial sum of the component vectors.

The invention possesses other objects and features, some of which, together with the foregoing, will be set forth in the following description of a preferred embodiment of the invention, and the invention will be more fully understood by reference to the accompanying drawings, in which:

Figure 3 is an elevation view of a phase setting means for adjusting the effective angle between the two vectors to be added.

Figure 1:
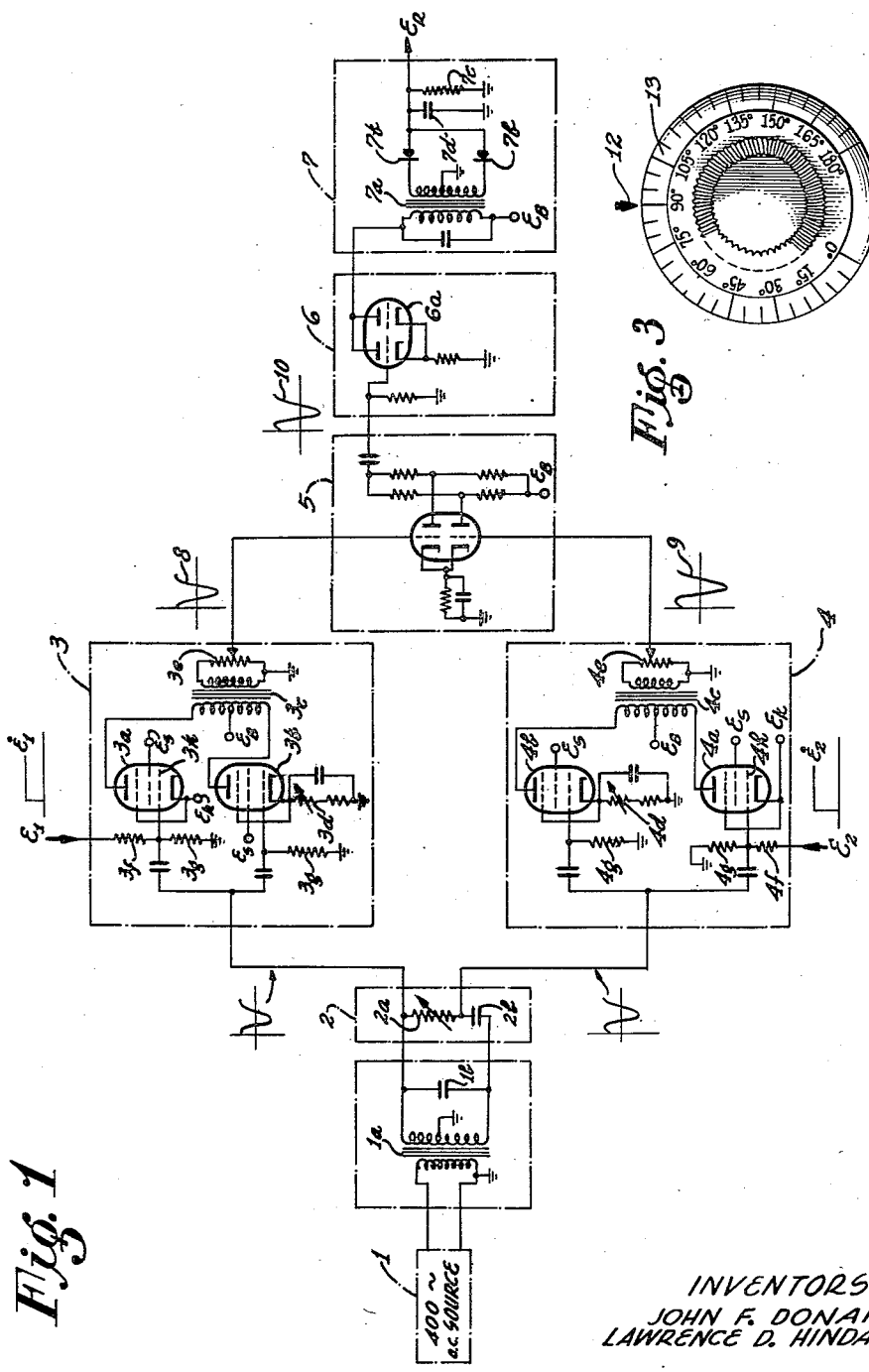
Figure 1 is a schematic wiring diagram of an electronic vector adder of a preferred construction.

Referring first to Figure 1, the electronic vector adder is broadly comprised of a constant frequency sine wave source 1, a phase-shifting network 2, two linear modulators 3 and 4, an electronic mixer 5, amplifier 6, detector 7, and a power supply (not shown).

A constant frequency sine wave source 1, such as for example a closely regulated A. C. generator, can supply a sine wave signal to the primary of transformer 1a. The inductive circuit of this transformer is preferably used to resonate with a condenser 1b to give a filter network for the sine wave frequency.

The phase-shift circuit 2, which consists of a variable resistor 2a in series with a condenser 2b can produce from the aforementioned sine wave signal a reference A. C. signal (no shift in phase) and one with its phase shifted to any desired value in the range from 0 to very nearly 180° without any change in amplitude of signal. The phase setting of the resistor 2a is easily determined from a stationary pointer 12 (Figure 3) and dial means 13 attached to the movable element of resistor 2a, which means was originally calibrated from viewing a Lissajous figure with an oscilloscope placed at the mixer circuit.

The reference A. C. signal is directed to modulator 3 and the phase-shifted A. C. signal to modulator 4. External D. C. signals $E_1$ and $E_2$, proportional in value to the magnitudes of two separate components vectors, are applied through resistors $3f$ and $4f$, respectively, to each modulator in order to linearly modulate the two A. C. sine wave signals.

The modulators 3 and 4 are each composed of two variable-mu tubes $3a$, $3b$ and $4a$, $4b$, respectively. A fixed cathode potential $E_K$ is applied to tubes $3a$ and $4a$. The A. C. balance of each circuit, at zero D. C. ($E_1$ or $E_2$) input, is obtained by adjusting the self bias resistors $3d$ and $4d$ of tubes $3b$ and $4b$. Opposing signals from tubes $3a$ and $3b$ are developed on each side of the center-tapped primary of transformer $3c$, and a similar condition exists for transformer $4c$ due to the outputs of tubes $4a$ and $4b$. The tubes are operated at a point in the center of the square law region of the transfer characteristic, and if the bias is varied about this point, the amplification will increase or decrease linearly with the bias. Each set of tubes of the modulator is placed in a bucking circuit and set at a null, hence, the increase in bias of one, $3a$ for example, would produce a linear increase in the output while a decrease in bias would give a corresponding increase with the tube signal of $3b$ being 180° out of phase with the former, or a linear decrease in output. Thus, the transformer output from each modulator is the difference of the two tube signals. Potentiometer voltage dividers $3e$ and $4e$ are placed across the secondary of transformers $3c$ and $4c$, respectively, to adjust the output voltages such that both modulators have the same constant of linearity which is defined as the ratio of change of transformer output voltage for a corresponding change of $E_1$ or $E_2$. Since the input sine waves must be of relatively small amplitude to utilize the linear change of slope of the square law characteristic, these voltage dividers also set the output voltage of the electronic adder. The voltage division of resistance $3f$—$3g$, and $4f$—$4g$, is chosen so as to keep the maximum D. C. voltage at grids $3h$ and $4h$, respectively, well within the linear range of the circuit.

The outputs of the modulators 3 and 4, being of the desired phase difference and at A. C. signal amplitudes proportional to impressed D. C. bias vectors $E_1$ and $E_2$, are vectorially added by the electronic mixer circuit 5 utilizing a double triode, the two portions of the tube operating as a resistance-coupled amplifier. A resultant sine wave is obtained which is equal in amplitude to the sum of the two linearly modulated sine waves at a phase difference set by the phase-shifting network 2.

This signal is next amplified by $a$, for example, double triode $6a$ connected as an amplifier 6, and passed through a center-tapped secondary coupling transformer $7a$. A D. C. output voltage $E_R$ is subsequently obtained by full wave rectification of the transformed voltage, the rectifier employing crystal diodes 7b and a resistance 7c-capacitance 7d, load. It is here noted that the output signal of amplifier 6 can be used to represent the vectorial sum magnitude of the two input vectors $\dot{E}_1$ and $\dot{E}_2$ if suitably calibrated A. C. means, as for example an A. C. voltmeter, is employed after this stage.

A standard power supply section (not shown) provides a filtered and preferably regulated voltage output for the electronic vector adder. A. C. filament voltage (6.3 v.), plus B voltage $E_B$ (240 v.), screen voltage $E_S$ (150 v.), and fixed cathode bias $E_K$ (7.5 v.) for the electronic adder is available.

Figure 2:
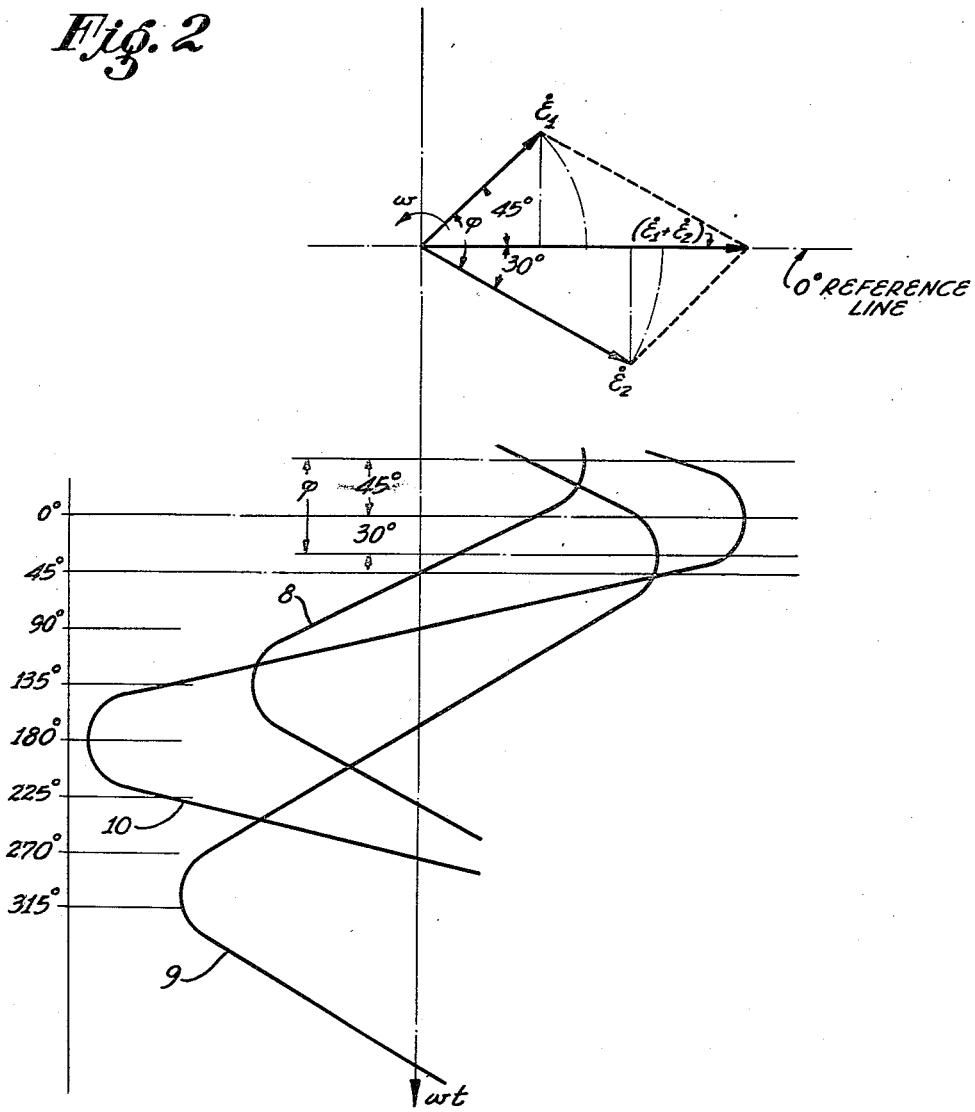
Figure 2 is a graphical diagram of two vectors whose resultant magnitude is to be solved by the present invention, together with characteristic waveforms appearing in the adder.

Referring to Figure 2, assume, for example, that the resultant magnitude ($\dot{E}_1+\dot{E}_2$) of the two vectors $\dot{E}_1$ and $\dot{E}_2$, there shown, is to be physically determined by use of the present invention. The two vectors are oriented in polar coordinates at +45 and +330 (or −30) degrees, respectively, from the 0 degree reference line in the graphical solution shown. For purposes of the present invention, the entire parallelogram made up of the vectors $\dot{E}_1$ and $\dot{E}_2$ is considered to rotate in a counter-clockwise direction with a uniform angular velocity $w$, and the horizontal projections of the various vectors represent the displacement as a function of time. The reason for this will be made more evident in the ensuing discussion.

The mode of operation is as follows:

A properly calibrated D. C. voltmeter is attached to the output of the electronic vector adder. The self-bias resistors 3d and 4d are first adjusted to balance each modulator circuit to a null, with zero D. C. inputs to the modulators 3 and 4. A null can be indicated by tapping an A. C. galvanometer temporarily to each modulator output lead, or by a zero voltage reading taken across each secondary of transformers 3c and 4c, respectively. Next, the potentiometer voltage dividers 3e and 4e are set such that adequate and equal outputs are obtained from each modulator for equal inputs. One manner of doing this is to place a D. C. voltage equivalent to a unit vector to each modulator alternatively and to check the output reading of the D. C. voltmeter attached to the adder output. The outputs thus obtained should be identical. As a further check on the calibration of the output D. C. voltmeter, the phase-shifting network dial is placed, for example, to read a phase difference of 90°. Now when unit vector voltages are simultaneously applied to each of the modulators, the D. C. output voltmeter should read a value proportional to $\sqrt{2}$ times the unit vector voltage. The electronic adder is now properly set.

For the particular example shown in Figure 2, the dial and pointer of the phase-shifting network 2 is set at 75° corresponding to the smaller angular difference between the vectors $\dot{E}_1$ and $\dot{E}_2$. Now then, when D. C. voltages proportioned to vectors $\dot{E}_1$ and $\dot{E}_2$ are applied arbitrarily to modulators 3 and 4, the amplification of each respective modulator will change such that linearly proportional A. C. sine wave signals differing in relative phase by an angle $\phi$, which is 75° in this case, are produced by the two modulators.

These modulator output A. C. voltages are taken off potentiometer voltage dividers 3e and 4e as shown by waveforms 8 and 9. The amplitude of these latter A. C. waveforms are linearly proportional to the D. C. input voltages which produced them.

Since these A. C. voltages 8 and 9, appearing at the modulator outputs, are to be vectorially added, the electronic mixer 5 accomplishes this at each instant of time to give a resultant A. C. voltage as shown by waveform 10 in Figure 2. An A. C. voltmeter could be used, when properly calibrated, to read the effective value of the resultant waveform 10; however, the present invention preferably feeds this output A. C. waveform through an amplifier 6 and detector 7. The D. C. output voltmeter then reads the magnitude of the resultant of the two input vectors.

It is thus seen that the resultant magnitude of any two vectors, separated by any angle $\phi$ less than 180°, can be obtained by use of the present electronic adder, the magnitude being represented by the reading on a voltmeter of the resultant A. C. waveform 10, as shown in Figure 2, or the rectified waveform of 10.

Means which is free of continuously moving parts and capable of producing a D. C. signal proportional to the absolute magnitude of a vector resultant of two known component vectors is provided by the electronic vector adder. Linear modulation of A. C. signals can be effected by D. C. signals, and since balanced modulation circuits are used, an increase or decrease of bias can be distinguished directly for continuously varying input vector signals. If the sine wave source frequency is increased, the permissable maximum rate of change of input signals is increased. It should be clearly noted here that the main limiting factor governing maximum rate of change of input signals is the regulation of frequency variations of the sine wave source which the maximum rate of input signal change should not exceed.

Phase-shifting is easily accomplished over a wide range with the electronic adder. Only a change of resistance, which involves the only operational mechanical motion of the system, is necessary to give a shift of phase. Once calibrated and set, the operation of the electronic vector adder only requires the setting of a dial.

By employing a plurality of adders, say $n$ cascaded units, a vector sum in $n+1$ space can be accomplished with the present invention. It is also useful in a servo network to control electrical mechanisms in particular by comparing input signals and utilizing the difference or output to re-insert into the system until correct inputs to the adder is secured. An additional advantage is the electronic device can be made relatively compact and light in weight.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modification within the legitimate and valid scope of the appended claims.

What is claimed is:

1. Means for the electronic addition of vectors at substantially any angle, comprising a constant frequency reference sine wave A. C. voltage source, variable phase-shifting means connected across said A. C. voltage source, two reference A. C. output circuits from said phase-shifting means having phase-shifted outputs, means for making the A. C. signals in said two reference A. C. output circuits equal in amplitude, a first and a second electronic tube modulator respectively connected to said two A. C. output circuits, said modulators each having bias control circuit means, said bias circuit of one of said modulators being adapted to receive a first D. C. voltage representing in amplitude one of the vectors to be added, and said bias circuit of the other modulator being adapted to receive a second, independent, D. C. voltage representing in amplitude a second vector to be vectorially added to the first at the angle set by said variable phase-shifting means, each of said modulators producing an amplified A. C. output of a phase determined by the angle set by said variable phase-shifting means and proportional to said D. C. voltages, respectively, electronic mixing means connected to both said amplified A. C. outputs, said mixing means having a single A. C. output with an amplitude giving the vector sum of said D. C. voltages, and means for converting said single A. C. output to a D. C. vectorial resultant output.

2. Apparatus in accordance with claim 1 wherein said phase-shifting means includes a center-tapped source winding having said constant frequency A. C. signal impressed thereacross, an adjustable series resistance and capacitance combination connected across the ends of said source winding, with one of said reference A. C. output circuits taken between one end of said source winding and the center tap thereof, and the other of said A. C. output circuits taken between said center tap and the junction of said resistance and capacitance.

3. Apparatus in accordance with claim 1 wherein said phase-shifting means are provided with indicating means calibrated in degrees to permit setting of said phase-shifting means at a selected indicated angle value thereby producing a known phase difference between the outputs of said reference A. C. circuits.

4. Apparatus in accordance with claim 1 wherein said converting means comprises an amplifier and a rectifier connected to said single A. C. output, whereby the D. C. output voltage of said rectifier represents the desired vectorial resultant.

5. Apparatus in accordance with claim 1 wherein said first and second modulators each comprise a balanced modulator, each modulator including two variable-mu tubes connected in a bucking circuit which includes a transformer having a center-tapped primary winding thereof connected across the outputs of said two tubes, said tubes operated at a point in the center of the square law region of the transfer characteristic, one of said tubes having a constant given bias and the other tube including said bias control circuit means to which one of said D. C. voltages is connected, the control input of each tube being connected in parallel to one of said two reference A. C. circuits, whereby variation of the connected D. C. voltage causes a linear change in the amplification of its respective tube to produce said amplified A. C. output in the secondary winding of said transformer.

6. Apparatus in accordance with claim 1 wherein means are provided in each modulator output to provide an equal output from each said modulator for equal vector voltage inputs thereto.

7. Apparatus in accordance with claim 1 wherein means are provided for obtaining only a constant frequency A. C. sine wave signal from said source, said means including a filter network connected across said reference A. C. voltage source.

8. Apparatus in accordance with claim 1 wherein said mixing means includes an electronic tube and decoupling means for preventing interaction of the two amplified A. C. outputs.

9. An electronic vector adder for continuously generating the vectorial sum magnitude of varying input D. C. vector voltages, said electronic adder comprising a constant frequency sine wave A. C. signal source, a filter and phase-shifting network including phase-setting and indicating means connected to produce from said sine wave A. C. signal source a reference A. C. sine wave signal and a phase-shifted A. C. sine wave signal, both said signals being of the same frequency and of equal amplitude, a first and a second balanced modulator, a first input for applying a first vector D. C. voltage to said first balanced modulator and a second input for applying a second vector D. C. voltage to said second balanced modulator, said modulator's outputs equalized for equal inputs and connected to said phase-shifting network at points determining said reference and said phase-shifted A. C. sine wave signals respectively, to produce modulated signals respectively proportional in amplitude to said D. C. voltage vectors, an electronic signal mixer connected to the outputs of said modulators to vectorially add said proportional modulated signals, and output means including an amplifier and full wave rectifier connected to said mixer to provide a D. C. output voltage representing the vector sum of said first and second D. C. vectors.

References Cited in the file of this patent

UNITED STATES PATENTS

| | | |
|---|---|---|
| 2,120,882 | Ballantine | June 14, 1938 |
| 2,130,172 | Armstrong | Sept. 13, 1938 |
| 2,238,249 | Crosby | Apr. 15, 1941 |
| 2,294,209 | Roder | Aug. 25, 1942 |
| 2,385,086 | D'Agostino et al. | Sept. 18, 1945 |
| 2,539,474 | Redard | Jan. 30, 1951 |
| 2,581,438 | Palmer | Jan. 8, 1952 |
| 2,661,152 | Elias | Dec. 1, 1953 |

OTHER REFERENCES

Tele-Tech, "Electronic Correlator Solving Complex Signalling Parameters," by Cheatham, February 1950, pages 40, 41, 42, 43 and 58.

Radio Electronics, Hindall and Donan, pages 76 and 77, February 1951.